Sept. 18, 1945.　　　B. T. BICKEL　　　2,384,807
IMPRINTING APPARATUS
Filed Feb. 2, 1942　　　6 Sheets-Sheet 1

INVENTOR
BRUCE T. BICKEL
ATTORNEY

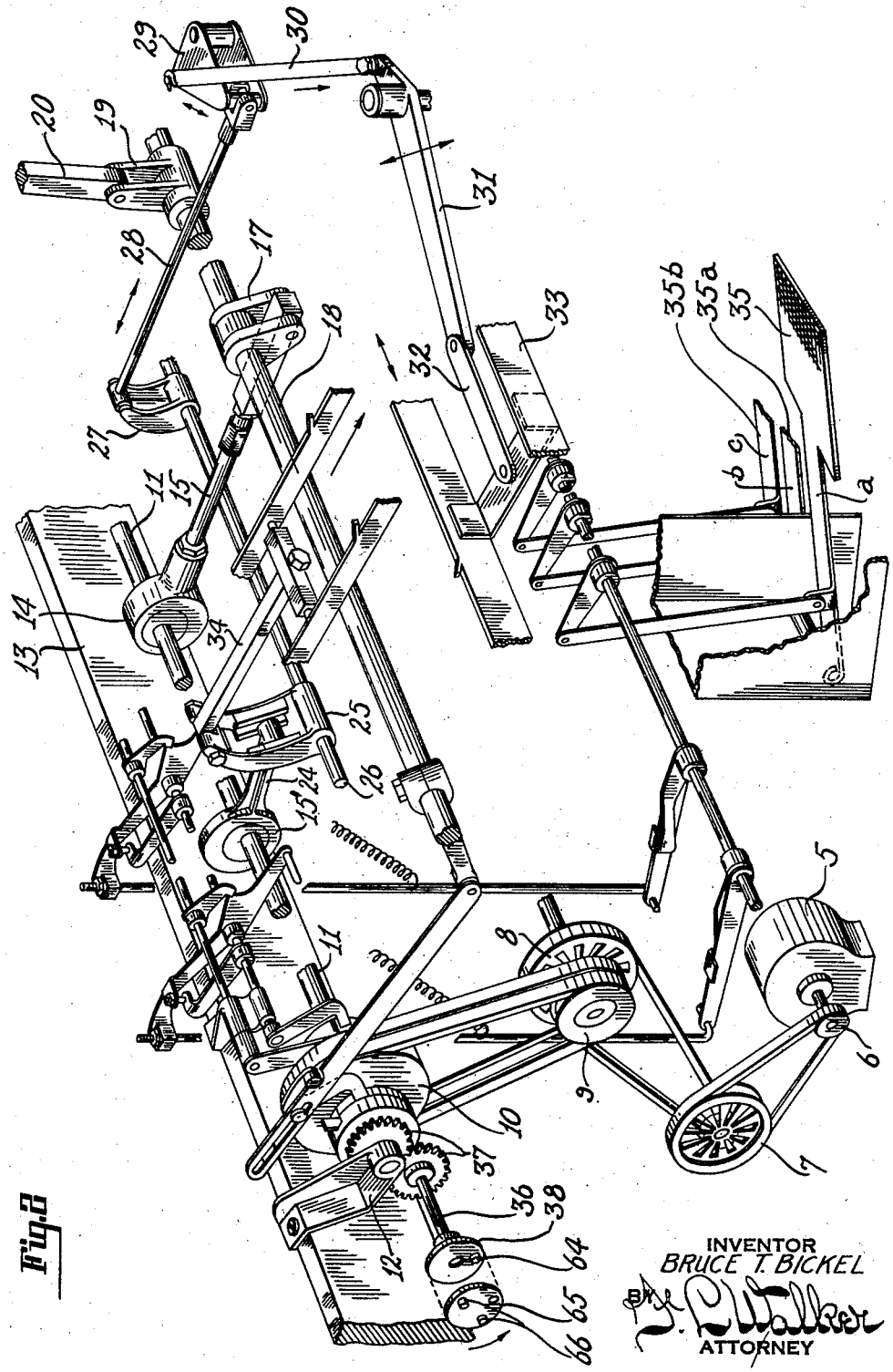

Sept. 18, 1945.    B. T. BICKEL    2,384,807
IMPRINTING APPARATUS
Filed Feb. 2, 1942    6 Sheets-Sheet 3
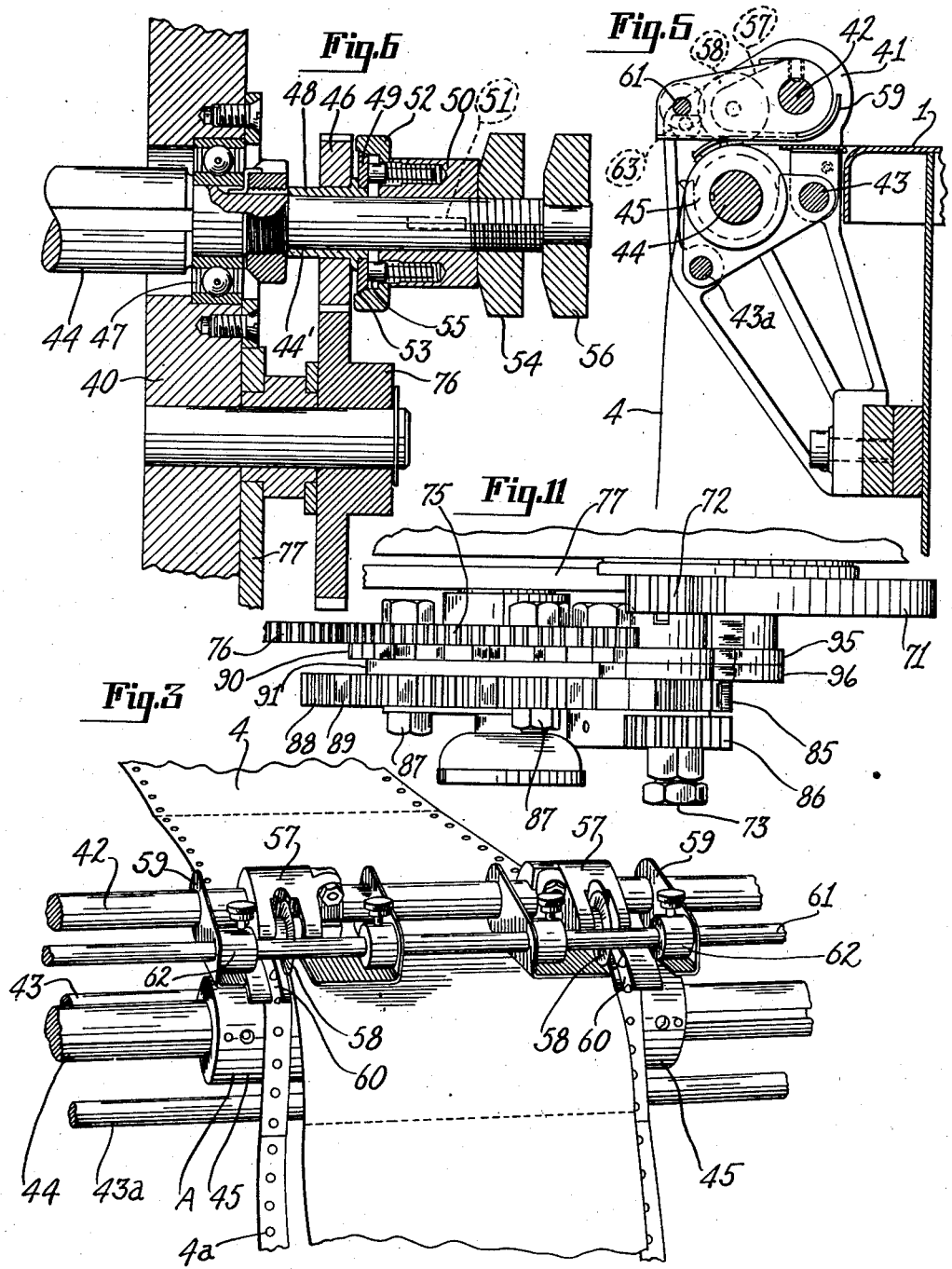
INVENTOR:
BRUCE T. BICKEL
ATTORNEY

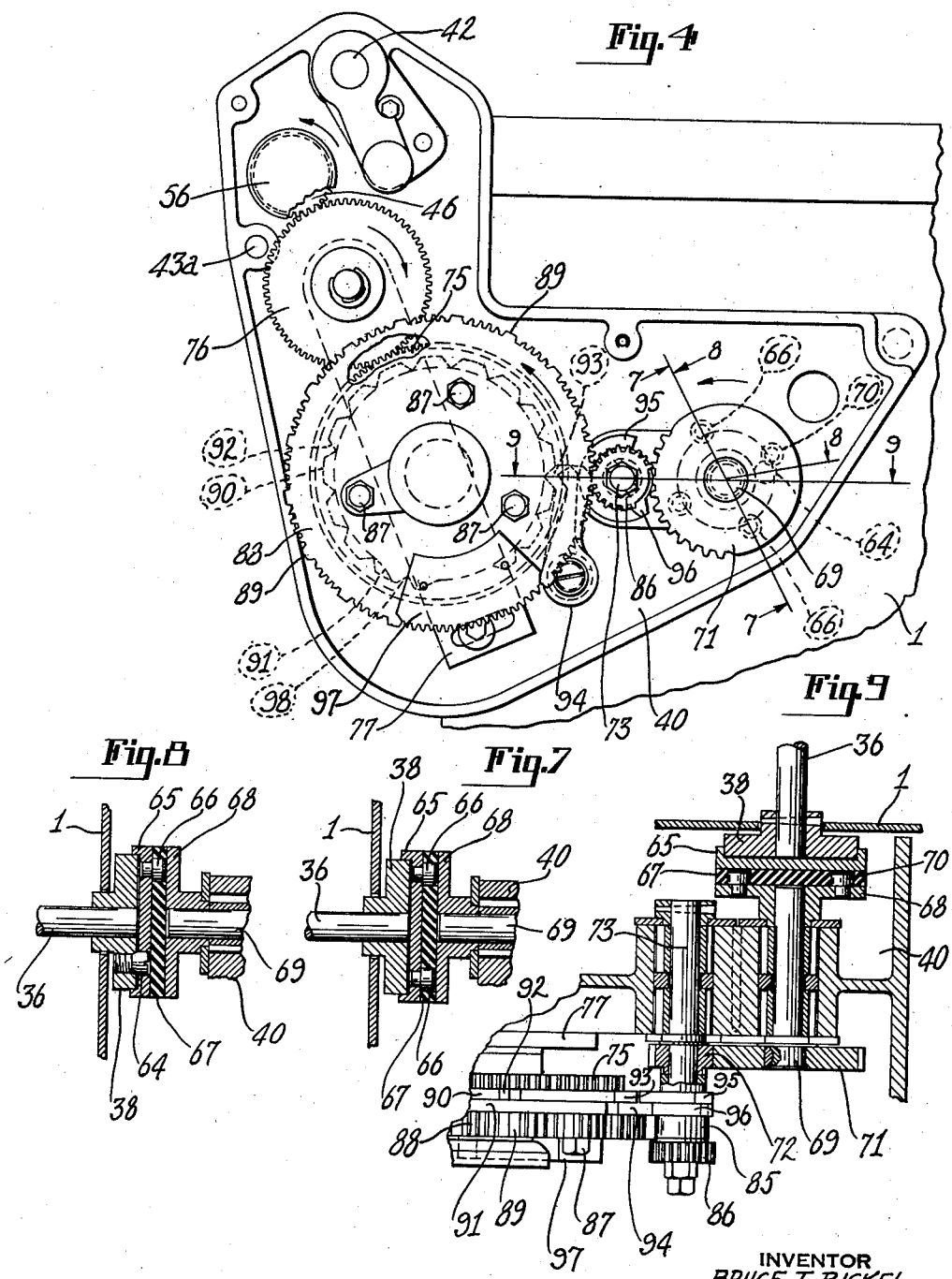

INVENTOR
BRUCE T. BICKEL
BY
ATTORNEY

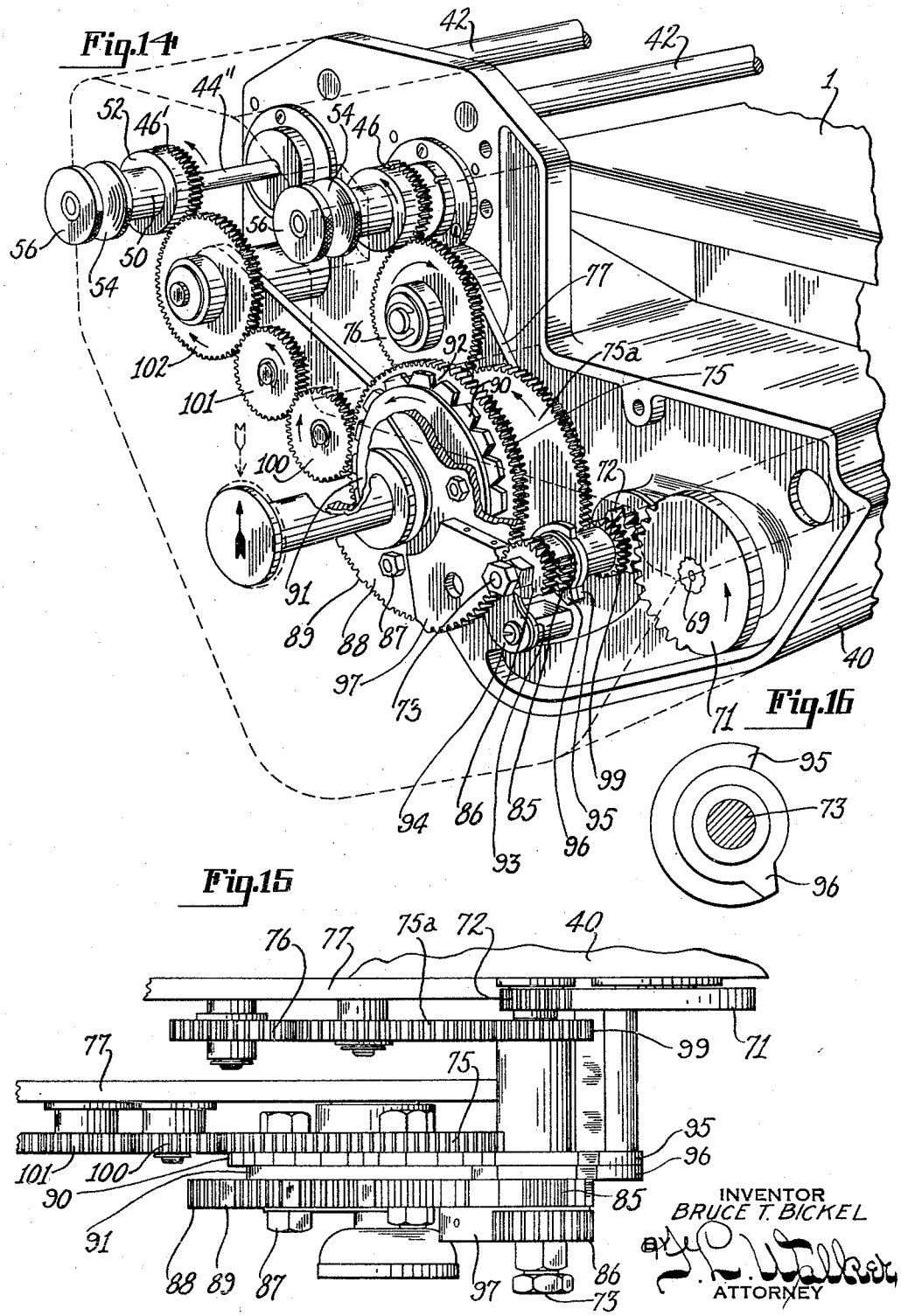

Patented Sept. 18, 1945

2,384,807

UNITED STATES PATENT OFFICE 2,384,807

IMPRINTING APPARATUS

Bruce Thomas Bickel, Dayton, Ohio, assignor to
The Standard Register Company, Dayton, Ohio,
a corporation of Ohio Application February 2, 1942, Serial No. 429,257

2 Claims. (Cl. 101—47)

This invention pertains to strip feeding and imprinting apparatus for producing successive impressions at longitudinally spaced intervals upon continuous series connected stationery, and more particularly to the application of pin type feeding means to such apparatus for progressively advancing the stationery and accurately positioning prescribed areas thereof in registry with the impression imparting devices.

There is illustrated in the present drawings an addressing machine having mechanism for advancing a succession of printing plates seriatum into operative position and pressure means for taking impressions therefrom, which apparatus, per se, forms no part of the present invention. While pin type feeding devices have been more or less extensively used to advance continuous record strips through typewriters, autographic register mechanism, tabulating and calculating machines, and other forms of address'ng machines, some difficulty has been experienced in applying pin type feeding devices to the type of imprinting apparatus herein illustrated and described and effecting properly synchronized operation thereof with the printing plate feeding and imprinting operations.

The object of the invention is to improve the construction as well as the means and mode of imprinting mechanism equipped with pin feed devices, whereby they may not only be economically constructed, but will be more efficient in use, automatic in action, uniform in operation, necessitate minimum additional parts for actuation of the pin type feeding means, and unlikely to get out of repair.

A further object of the invention is to provide a pin type strip feeding mechanism which can be readily and quickly applied to existing imprinting apparatus without disturbance of the mechanism thereof.

A further and important object of the invention is to enable accurate synchronism of the strip feeding devices with the plate feeding and impr'nting operations.

A further object of the invention is to provide a compact assembly of unitary form which may be attached to and detached from existing imprinting apparatus without change thereof, and which is adapted to utilize ex'sting timing and operating parts of the imprinting apparatus for properly synchronized operation of the pin type feeding mechanism.

A further object is to provide dual feed mechanism for feeding plural strips simultaneously through different range of movement.

This invention pertains especially to differential feeding of a record strip and means for justifying each advancement to assure accurate registry of imprinted legends with prescribed record receiving areas of the strip.

A further and important object of the present invention is to provide means for differentially feeding a record strip through a predetermined sequence of advance steps, including steps of different extent, as, for example, through a succession of line spaces, followed by a larger step to accommodate a heading of a succeeding form length.

A further object of the invention is to provide dual feed mechanism for feeding different strips different distances in addition to varying the extent of advance steps of at least one strip or set of strips.

A further object of the invention is to provide a pin type feeding unit for an imprinting apparatus having the advantageous structural features and the inherent meritorious characteristics herein mentioned.

A further object of the invention is to provide the herein mode of adapting a pin type feeding unit to synchronous operation with an imprinting apparatus.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a perspective view of an imprinting apparatus to which the present invention has been applied.

Fig. 2 is a perspective view of the motion transmitting mechanism of the imprinting apparatus, by which the plate feeding and pressure applying mechanism is actuated and to which the timed driving means for the pin type feeding devices is operatively connected.

Fig. 3 is a perspective view of the pin type, intermittently operated strip feeding mechanism removed from the imprinting machine.

Fig. 4 is a side elevation of the motion transmitting train from the imprinting to the strip feeding apparatus, contained within the housing at the right of Fig. 1, with the housing cover removed.

Fig. 5 is a detail sectional view of the pin feed assembly and the supporting bracket at the left end thereof in Fig. 1.

Fig. 6 is a detail sectional view of the differential adjustment clutch and a part of the drive connection to the pin wheel shaft of the feeding unit.

Figs. 7 and 8 are detail sectional views in different planes of the resilient coupling between the printing machine mechanism and the drive devices for the pin feed assembly.

Fig. 9 is a sectional plan view on line 9—9 of Fig. 4.

Fig. 11 is a detail top plan view of the mechanism shown in Fig. 10.

Fig. 14 is a perspective view of a duplex feed transmission mechanism wherein different strips are advanced simultaneously different distances.

Fig. 15 is a top plan view of the mechanism shown in Fig. 14.

Fig. 16 is a detail view of a pair of cams for operating the justifying pawls.

Like parts are indicated by similar characters of reference throughout the several views.

The present invention pertains especially to a particular motion transmission train with means for effecting differential advancement of a record strip and means for justifying the successive movements to assure exact registry of the imprinted impression in a definite prescribed position upon the strip.

*Imprinting mechanism*

Figure 1:
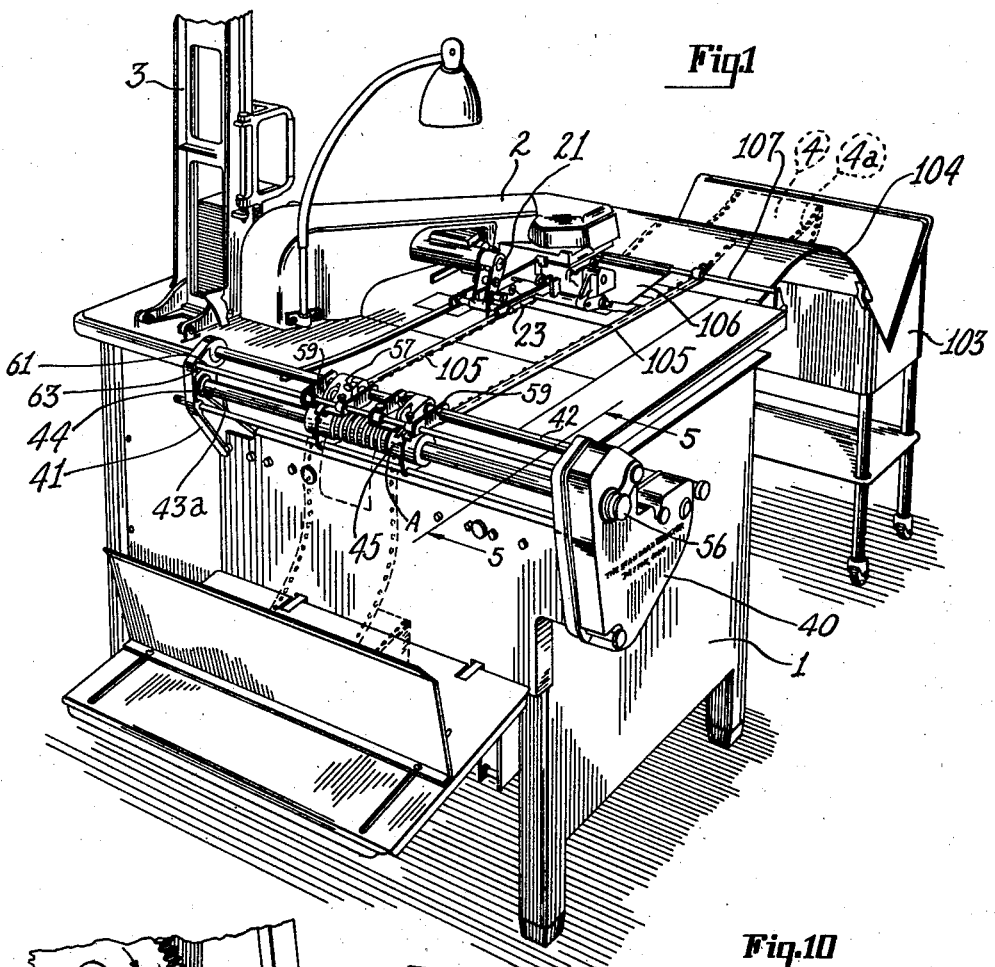
Figure 10:
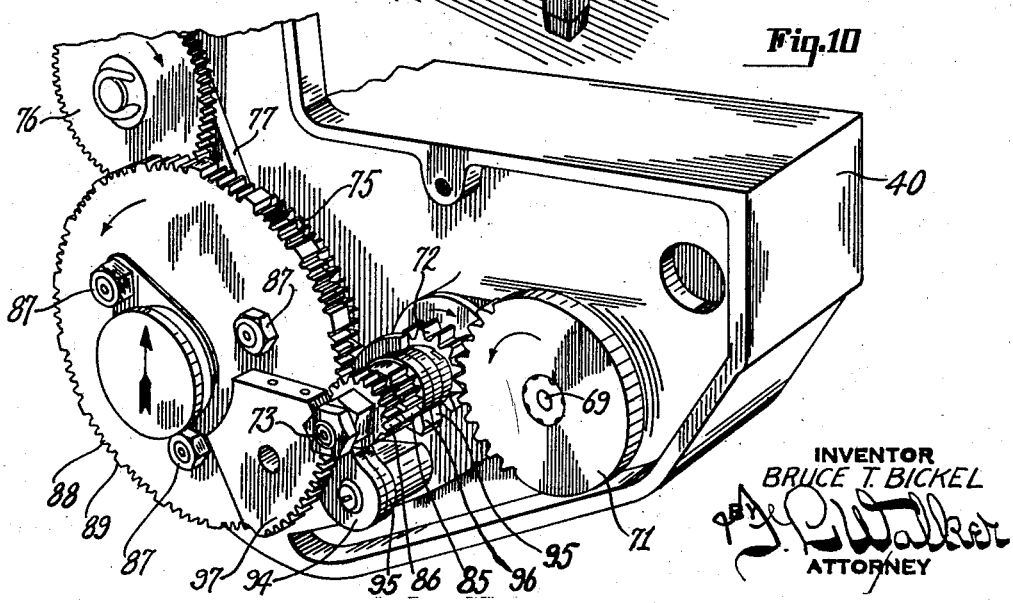
Fig. 10 is a perspective view of the initial portion of the transmission gear train.
Figure 12:
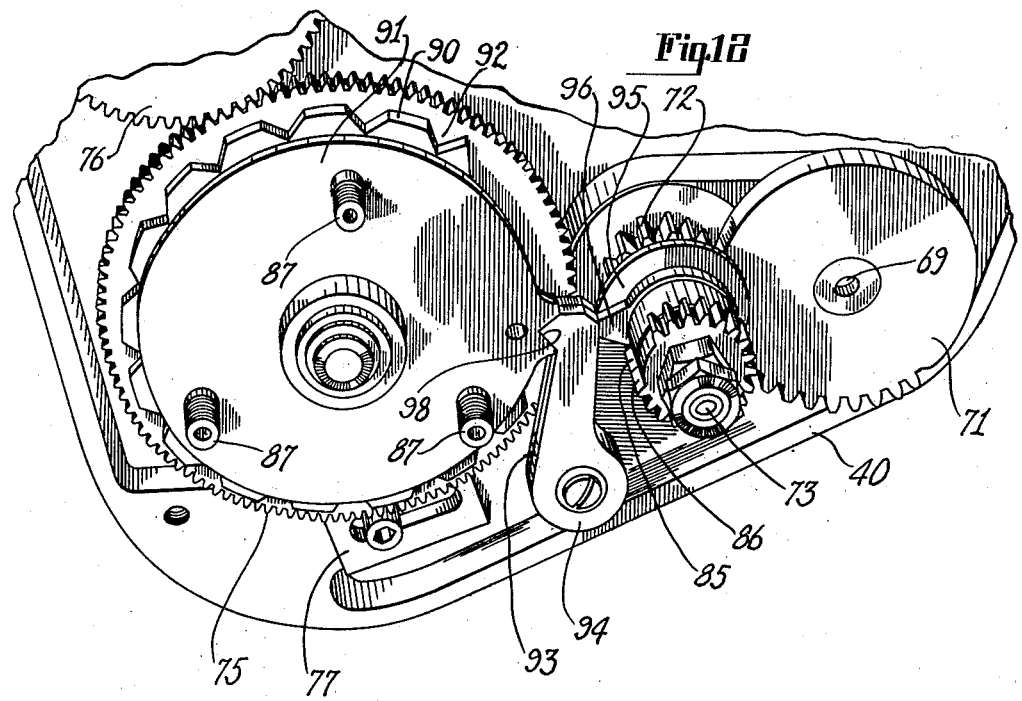
Fig. 12 is a perspective view of the transmission mechanism with the parts in justifying position at the end of the maximum feeding movement.
Figure 13:
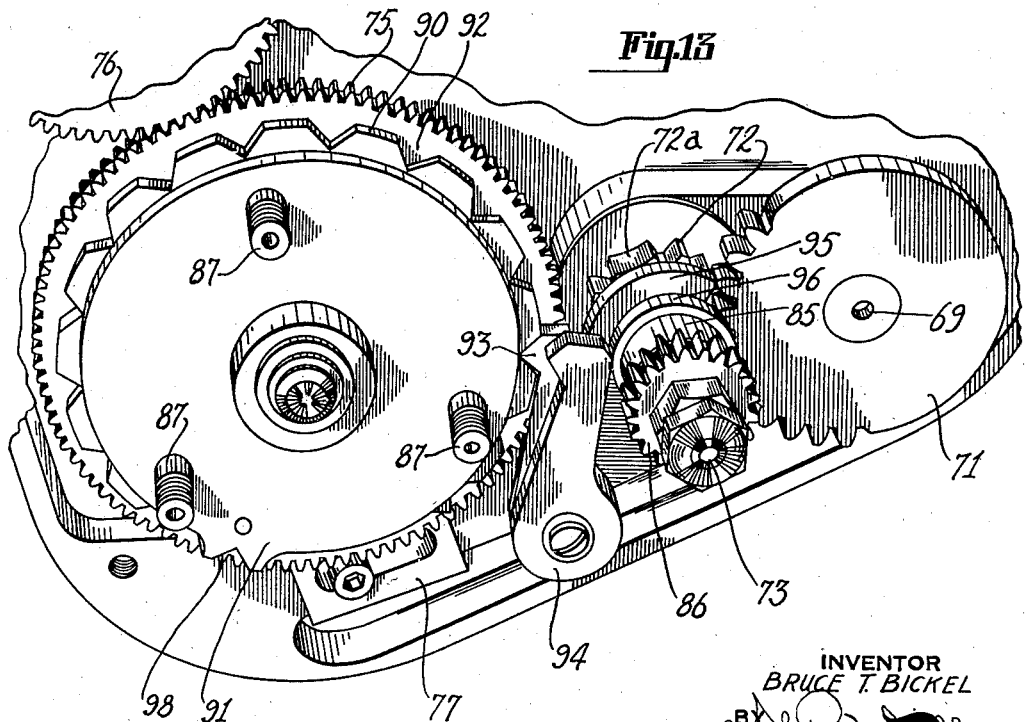
Fig. 13 is a similar view of the transmission mechanism with parts in relation for justification at the end of a line space advancement.

The present strip feeding mechanism and drive mechanism therefor is especially adapted for application to a typical modern addressing machine, as shown in Fig. 1, and is actuated in properly timed sequence with the plate feeding and imprinting devices thereof by common operating mechanism. In such type machine, the mechanism is completely enclosed in a cabinet or housing 1, having the general appearance of a flat top office desk. Overhanging the top of the cabinet is a cantilever arm 2 which carries impression mechanism by which legends are imprinted onto properly positioned record material from interchangeable printing plates fed seriatim from an upright printing plate magazine 3 projecting above the cabinet.

The imprinted impressions are produced upon one or more continuous strips 4 of series connected form stationery, which are progressively drawn through a step-by-step movement past a recording position beneath the head of the arm 2 and impression devices carried thereby by the pin type feeding unit A (Fig. 1) supported at the rear edge of the cabinet 1. The record material 4 is ordinarily withdrawn from a supply packet in a rack at the front of the machine and after being imprinted is refolded into a receiving tray at the rear of the machine beneath the strip feeding unit A.

The essential parts of the actuating mechanism of the imprinting apparatus, from which the strip feeding unit A derives intermittent motion, are quite compactly arranged within the cabinet. Such mechanism, for convenient illustration, is shown in extended form in Fig. 2.

Driving power is transmitted from an electric motor 5 through a system of belts and pulleys 6, 7, 8, 9 and 10 to the main drive shaft 11 of the machine. The shaft 11 is journaled in bearings 12 secured to a frame bar 13, and carries two spaced eccentrics, the throw of which is adjusted to operate successively. The eccentric 14 is connected by a pitman or connecting rod 15 with a double rock arm 17 on a rock shaft 18 extending parallel with the main shaft. The rock shaft 18 carries a second rock arm 19 to which is attached a link 20 operatively connected to the impression mechanism carried by the overhanging arm 2 above the cabinet. The link 20 transmits intermittent motion to a rock shaft 21 projecting laterally from the imprinting mechanism arm 2, and thence to a dependent swinging arm thereon to which are connected reciprocatory bars 23, by which the printing platen or presser mechanism is operated to press the record material 4 against an underlying printing plate which has theretofore been advanced from the upstanding magazine 3 into printing position.

The imprinting plates are advanced seriatim from the magazine 3 into imprinting position beneath the presser devices carried by the overhanging arm 2 preparatory to succeeding imprinting operations through influence of the eccentric 15' upon the power shaft 11. The eccentric 15' is connected by a pitman or connecting rod 24 with a double rock arm 25 upon a rock shaft 26, which extends in parallel relation with the main shaft 11 and the platen operating shaft 18. The rock shaft 26 carries a second rock arm 27 which is connected through a train of cranks and levers 28, 29, 30, 31 and 32 with a reciprocatory slide 33, by which the printing plates are ejected one by one from the magazine 3 and advanced through an initial path of travel transversely of the machine. Connected to the rock arm 25, additionally to the pitman 24, is a reciprocatory link 34 which actuates an auxiliary carrier for the ejected printing plates, by which the plates advanced in one direction by the reciprocatory slide 33 and associated parts are given further advance movement transversely to their initial path of movement into the imprinting position beneath the head of the overhanging arm 2, and also beneath the record strip 4 which is imprinted on its under side, upon operation of the machine. Such advancement of the successive printing plates occurs alternately with the operation of the presser device or platen by which succeeding portions of the record strip 4 are pressed against the successive positioned printing plates.

Likewise, as hereinafter more fully explained, the intermittent feeding movements of the feeding unit A occur alternately with the actuation of the impression mechanism. The operation of the machine is controlled by a series of pedals 35, 35a and 35b, which are interconnected respectively so as to cause the mechanism to operate (a) to idly advance the record strip without imprinting thereon and without changing the printing plate, (b) to cause the imprinting operation of the machine to continue repetitiously with corresponding interchange of succeeding printing plates and advancement of the record material, and (c) effect one cycle operation of the strip feeding, plate feeding and imprinting operations upon each depression of the corresponding control pedal. Mounted in parallel offset relation with the power shaft 11 is a countershaft 36 connected with the power shaft 11 for unison rotation by intermeshing gears 37. The countershaft 36 carries a coupling head 38 for driving interconnection with the strip feeding unit A, the embodiment of which with such plate feeding and imprinting mechanism forms the subject matter hereof.

Strip feeding mechanism

The present pin type strip feeding mechanism is mounted on the rear of the cabinet 1, with the strip engaging pin wheels substantially tangential to the cabinet top. The strip feeding unit A includes a transmission housing 40 secured to one side of the cabinet and projecting therebeyond both upwardly and rearwardly, and a bracket 41 secured to the cabinet 1 in spaced relation with the transmission housing 40 and interconnected therewith by a plurality of parallel spaced rods 42, 43 and 43a. Journaled at one end in the bracket 41, and at its opposite end in the transmission housing 40, is a revoluble pin wheel shaft 44 on which are mounted a pair of relatively spaced, axially adjustable pin wheels 45, the pins of which are progressively engageable in marginal longitudinally spaced holes 4a in the record strip 4.

On the extremity of the pin wheel shaft 44 is the final or driven gear 46 of the driving train hereinafter described. This gear 46 is engageable with the pin wheel shaft in different positions of rotative adjustment by a "variable," as is illustrated in Fig. 6. The shaft 44 is mounted in a bearing 47 in the inner wall of the transmission housing 40. A reduced extension 44' of the shaft carries a sleeve 48 loosely journaled thereon, on which is fixedly mounted the gear 46 and adjacent thereto one member 49 of a variable clutch, the periphery of which is preferably knurled.

Axially adjustable upon the shaft extension 44' is a sleeve 50 which is keyed to the shaft at 51 for unison rotation but free for longitudinal shifting movement. The sleeve 50 includes a clutch head 52, having therein a lateral tapered knurled recess 53 within which the tapered margin of the clutch disc 49 is frictionally engageable under longitudinal thrust pressure. Axial pressure is exerted upon the clutch sleeve 50 to effect driving engagement between the disc 49 and head 52 by a jamb nut 54 screw threaded upon the shaft and bearing against the end of the clutch sleeve 50. Upon relaxing tension of the jamb nut 54, spring pressed plungers 55 carried by the sleeve and bearing upon the lateral face of the clutch disc 49 act to instantly separate the interengaging clutch faces by retracting the sleeve 50. When disengaged as described the shaft 44—44' is free for revoluble adjustment independently of the driving mechanism within the transmission housing 40 by a terminal knob 56. This enables the record strip 4 to be minutely adjusted to or fro to assure accurate registry of a predetermined area thereon with the imprinting position, after which the pin wheel shaft is again secured in adjusted relation with its drive train by tightening the jamb nut 54.

The pin wheels 45 have radial spaced pins engageable in the marginal holes 4a of the record strip 4 to positively control the movement of the record strip through successive movements of predetermined extent and prevent overthrow or lag of the strip. Mounted on the transverse tie rod 42 of the strip feeding unit are a pair of arms 57, in which are mounted trimming discs 58, engageable with the passing strip 4 to remove therefrom the marginal areas containing the feed holes 4a. The trimmer discs may be sharpened cutters which coact with the peripheral surfaces of the pin wheels 45 adjacent to the feeding pins to sever the strip, or they may be dull or blunt edged discs which break the strip on a previously weakened longitudinal line. Also mounted on the rod 42 are strip guides and hold-down members 59 which are slotted at 60 for clearance of the feeding pins, and which serve to hold the record material loosely in engagement with the feeding pins and prevent accidental disengagement therefrom. The strip guides and trimmers are axially adjustable on the rod 42 to accommodate record strips of different widths. They are further vertically adjustable about the axis of the rod 42 to facilitate initial engagement of the record strip with the pin wheels. The strip guide and hold-down members 59 are interconnected for unison swinging motion by a rod 61 having thereon clamp collars 62, which determine the positions of longitudinal adjustment of the strip guides 59. The rod 61 is independent of the supporting bracket 41 and transmission housing 40, but in the depressed operative position of the strip guides and trimmers, the ends of the rod 61 engage stop lugs 63 on the bracket and transmission housing to limit the approach of the strip guides and trimmer discs toward the strip.

Transmission mechanism

The pin wheel shaft 44 is actuated in timed sequence with the printing operations through a gear train within the transmission housing 40 and illustrated in Fig. 4. The coupling between the transmission shaft 36 of the imprinting mechanism and the drive train for the strip feeding unit is resilient and adapted to absorb the shock of sudden start and stop operation. Referring to Figs. 7, 8 and 9, the coupling head 38 of the imprinting machine shaft 36 carries one or more studs 64 which engage in corresponding holes in a flanged disc or cap 65. The latter in turn carries like studs 66 which engage in corresponding holes in a rubber disc 67 interposed between the flanged disc or cap 65 and a head 68 upon a stub shaft 69 journaled in the lower portion of the transmission housing 40 (Figs. 4 and 8). The head 68 carries two diametrically opposite studs 70 which also engage in holes in the interposed rubber disc 67 in a diametrical plane transversely of that of the studs 66 of the cap 65. The first pair of studs and the interengaged parts are shown in Fig. 7 on a diametrical section 7—7 of Fig. 4 at right angle to that of Fig. 7. Fig. 8 illustrates both the driving coupling between the initial head 38 and the disc or cap 65 by the stud 64 and the drive engagement between the disc 65 and the interposed rubber disc 67 by a stud 66 in a section upon intersecting planes 8—8 of Fig. 4.

The stub shaft 69 carries at its end opposite the coupling head 68 one member 71 of a Geneva gear couple having peripheral teeth cut in only a portion of its periphery. In the present instance, the teeth extend approximately one-third around the gear member 71 and intermesh during a part of its rotation with a mutilated gear pinion 72. A full rotation is transmitted to the pinion 72 during approximately a third rotation of the driver 71, at the end of which the pinion 72 remains temporarily at rest during the remainder of the rotation of the driver 71.

The gear elements 71 and 72 comprise a

Geneva gear couple, wherein an arcuately indented segment 72a of the pinion 72 agrees with the untoothed or smooth portion of the periphery of the larger gear 71 to thereby lock the smaller pinion against rotation while the larger gear continues to rotate until the toothed segment thereof is again brought into engaging relation therewith.

Intermittent motion through a succession of steps of varying extent is transmitted from the mutilated gear pinion 72 to a gear 75 and thence through an idler gear 76 to the driven gear 46 upon the pin wheel shaft by intermediate transmission elements. To accommodate interchangeable gears by which the drive ratio may be changed, the gear 75 is preferably, but not necessarily, carried on a swinging arm 77 which may be secured in different positions of adjustment.

As thus far described, the mechanism and operation is quite analogous to those disclosed in the companion application before mentioned.

For transferring intermittent motion from the mutilated gear pinion 72 to the gear 75, there are provided upon the stub shaft 73 within the housing 40, and in concentric relation with the pinion 72, a pair of additional gear pinions 85 and 86 which are coupled for unison rotation with each other and with the initial pinion 72. Detachably connected in fixed relation with the gear 75 of the transmission train by attachment studs 87 is a mutilated gear wheel 88. In the present instance the gear wheel 88 has its peripheral teeth arranged in successive groups of four teeth and five spaces each, separated by short, smooth segments 89.

The gear wheel 88 coacts with the mutilated gear pinion 85, which in the present instance is provided with five teeth engageable with a succeeding group of four teeth of the wheel 88 at each revolution of the pinion. Intermediate such engagement the peripherally smooth segment of the mutilated gear pinion 85 has wiping engagement with a segment 89 of the gear 88, in quite the same manner as a Geneva gear couple, and stops the gear 88 temporarily against rotative movement. Being directly coupled to the gear 75, the partial movement of the gear 88 at each rotation of the several gear pinions 72, 85 and 86 is transmitted through the gears 76 and 46 to the pin wheel shaft 44 to advance the record strip 4 the distance of one line space. It will be obvious that by increasing or decreasing the number of teeth of each group of the gear 88 and the corresponding pinion 85, the distance the strip is advanced at each operation may be increased or decreased. The mutilated gear 88 and intercoupled gear 75 are advanced one step at each rotation of the interconnected gear pinions 72, 85 and 86, to effect unison advance movements of the pin wheel 45 and engaged record strip 4. However, due to back lash in the gears, and other lost motion and inaccuracies of manufacture, the movement of the pin wheel might not be arrested with the selected area of the record strip in exact registry with the imprinting position. To justify the feeding movement of the strip by correcting any overthrow or underthrow of the feeding movement, and finally adjust the pin wheel to bring the selected line of space of the record strip into exact registry, there are fixedly mounted upon the studs 87 intermediate the gear wheels 75 and 88 two cam discs 90 and 91. The disc 90 has therein a series of uniformly spaced, angular notches 92, one for each group of teeth of the gear 88. Pivotally mounted in the housing 40 adjacent to the gears 75 and 88 and discs 90 and 91 provided with angular faces disposed in the planes of the discs. The cam head of the pawl 93 is engageable under pressure in a V shaped notch 92 of the disc 90 at the end of each advancement of the gears and discs. To actuate the pawls 93 and 94 into engagement with the discs, two cams 95 and 96 are mounted on the stud 73 and connected for unison rotation with the gear pinions 72, 85 and 86. At the completion of each rotation of the pinion group during which the pinion 85 has engaged and advanced the gear wheel 88 through one advance stop, the cam 95 engages and oscillates the pawl 93 to press its cam head into a notch 92 of the disc 90 which has been brought opposite thereto. The camming engagement of the angular pawl head with one side or the other of the V shaped notch 92 will minutely advance or retract the disc 90 and with it the gear 75 as may be necessary to effect a final adjustment of the pin wheel 45 and record strip 4 to exactly register the prescribed area thereof with the imprinting position.

As illustrated in the drawings, the mechanism is designed to advance the record strip through a succession of fourteen line spaces, and imprint each line space position. The mechanism then imparts longer movement to the record strip (approximately three inches) to carry an imprinted heading upon a succeeding record form past the imprinting position and cause the next imprint to be registered with the first line of the succeeding form.

To this end, there is fixedly attached to the side of the gear 88 which has successive groups of peripheral teeth, a gear segment 97, which, as the gear approaches the end of a complete rotation (after fourteen line space advancements), is engaged by the gear pinion 86. The engagement is maintained until the gear 88 and with it the gear 75 and intermediate cam discs 90 and 91 have been advanced the full extent of the gear segment 97. This action transmits to the strip feeding devices sufficient movement to advance the strip past a form heading and register the first imprint space of a succeeding form in imprinting position. The disc 91 intermediate the gears 88 and 75 and revoluble therewith has but one peripheral cam notch 98 which is brought opposite the cam head of the pawl 94 by such extended advancement of the gears. At the end of such movement, and after the driving pinion 86 has disengaged the gear segment 97, the angular head of the pawl 94 is forcibly pressed into the cam notch 98 by the cam 96 which rotates with the gear pinion group. The camming action of the pawl 94 either minutely advances or retracts the disc 91 and with it the gear 75 to effect such adjustment as may be necessary to bring the first impression receiving line or space of the new form into exact registry with the printing position. The cam notches 92 and 98 and the angular cam heads of the pawls 93 and 94 are of sufficient size that if necessary they would be effective to adjust the strip feeding devices the distance of approximately a half line space in either direction. This, however, is excessive, as the necessary final justification of the feeding movement is quite small, if indeed it is ever necessary. While advance movements of fourteen line spaces followed by a heading space of approximately three inches have been mentioned, this is for illustrative purpose only, and not with intent to limit the disclosure in any respect. The spacing of the successive imprinted legends may be either increased or decreased and the number thereof may also be varied, by properly proportioning the gear ratio and accordingly designing the gear 88 and segment 97 and the corresponding driving pinions.

To meet certain conditions of use, wherein it is desired to feed different strips or groups of strips of a manifolding assembly differentially to effect differently spaced imprinted legends on different strips, or to otherwise differentiate the arrangement and relation of imprints thereon, there is illustrated in Figs. 14 and 15 a duplex assembly having two strip feeding mechanisms, including separate transmission gear trains actuated from a common source.

As before described, the power derived from the plate feeding and imprinting apparatus is delivered in properly timed sequence through the mutilated gear 71 to the mutilated gear pinion 72 which comprise a Geneva gear couple. On the stub shaft 73 and connected for unison rotation with the gear pinion 72 is a gear pinion 99 which meshes with the idler gear 75a of the primary gear train, and transmits power directly thereto and thence through the second idler gear 76 to the driven gear 46 upon the primary pin wheel shaft 44. The driven gear 46 is connected to the pin wheel shaft through a "variable" coupling as described. The gear 75a is carried on a swinging arm 77, which enables the gear 75a to be intermeshed with gears of other size which are interchangeable with the pinion 99 to change the gear ratio and speed of the pin wheel shaft 44. On the same stub shaft 73 and coupled for unison rotation with the pinions 72 and 99 are the gear pinions 85 and 86 which engage respectively with the interconnected gear 88 and gear segment 97, as before described. The gear 88 is fixedly connected by the studs 87 with the gear 75. The gear 75 of this second train drives two small intermediate idlers 100 and 101, which in turn drive a further idler gear 102 which corresponds to the idler 76 of the primary gear train. The latter gear 102 intermeshes with the driven gear 46' on the pin wheel shaft 44" pertaining to the second set of strip feeding devices. The driven gear 46' is connected through a "variable," as before described, with the pin wheel shaft, by which the registry of the record strip may be manually adjusted independently of the driving mechanism.

Due to differences of sizes of gears of the respective transmission gear trains, the pin wheel shafts 44 and 44" are actuated in unison but at different rates of speed or to different degree, whereby different superposed strips of a manifolding assembly may be advanced differentially. By interchanging the gear pinions 85, 86 and 99 upon the stub shaft 73 for others of different size, with corresponding changes of the gear 88 and segment 97, the resulting feeding movements of several record strips may be varied through wide range.

Likewise, by interchanging the gear segment 97 for another of different extent, the ratio between the advancements of equal extent, to wit, the line spacing, and the extent of the following advancement of different extent, as to accommodate a heading when passing from one printed form to another, may be varied. Obviously, the successive cycles of operation may be widely varied and arranged to differentially advance the strip long and short distances in different combinations and in different proportions by varying the extent of the relatively spaced groups of gear teeth of the gear 88. At the end of each cycle of operation of whatever extent the feeding device is "justified" by the camming action of the cam heads of the arms 93—94 in the corresponding notches of the discs 90 and 91. The interengagement of the disc and cam head effects a final adjustment of the motion transmission mechanism additional to the operation of the driving devices, to assure accurate registry of a prescribed area of the record strip with the imprinting position.

As is illustrated in Fig. 1, the record material supply pack holder or stand 103 is set far enough forward of the machine to enable the strip to follow an easy path over a curved guide bridge 104 onto the top of the cabinet 1 and thence past the printing position beneath the overhanging arm 2. Long guide strips 105 overlie the record material during its travel across the top of the cabinet to hold the strip down and guide it. Forward of the printing position a friction plate or gravity drag 106 rests upon the advancing strip to impose a slight tension and maintain the folds of the strip extended and flat. This tension or drag plate is pivotally mounted on a transverse rod 107 supported in brackets at the forward edge of the cabinet top. The strip feeding apparatus is removable from the machine as a unit by disengagement of screws which attach the bracket 41 and gear housing 40 to the cabinet.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A strip feeding attachment for a printing apparatus having a continuously revoluble actuating shaft forming a part of the imprinting apparatus, including an intermittently operable strip engaging device intermittently advancing a continuous strip of record material through successive step by step movements of predetermined extent, a mutilated gear couple, the driver member of which is operatively connected with the printing apparatus actuating shaft for unison operation, and the driven member of which is actuated during a portion only of the cycle of operation of the driving member and is locked against operation during the remainder of said cycle, a coacting gear member having a succession of separate groups of gear teeth engaged by the driven member of the mutilated gear couple to advance the coacting member through a succession of partial rotations, a notched disc connected to and rotating in unison with the partial rotations of the coacting gear member, a movable cam engageable in successive notches of the disc to give definition to the movement of the coacting gear member and arrest the movement of said coacting gear member at the end of a prescribed range of movement, a presser device operated in unison with the driven member of the mutilated couple to forcibly engage the cam in a notch of the disc, and an operative connection between the coacting gear member and the strip feeding device for driving the latter proportionately to the movement of the former.

2. An intermittent strip feeding attachment for an imprinting apparatus wherein a continuous strip of record material is imprinted at longitudinally spaced intervals, by imprinting devices, relative to which a strip feeding device intermittently advances the record strip predetermined distances past an imprinting position in synchronism with operation of the imprinting devices, including transmission mechanism for operating the strip feeding device in timed sequence with operation of the imprinting devices characterized by a gear wheel advanced through successive partial rotations of substantially equal extent, followed by at least one additional partial rotation of greater extent, a notched disc rotating in unison with the gear wheel, a locating member having camming engagement in successive notches of the disc to give definition to the movement of the gear and adjust it to a final position at the end of each movement, means for intermittently actuating the gear in synchronism with the operation of the imprinting devices, including two mutilated gear couples arranged in series and transmitting intermittent motion one to the other from the drive member of the initial couple connected to the printing mechanism for continuous rotation to the driven member of the second mutilated gear couple to which the aforementioned gear wheel is connected for unison operation, and means for transmitting successive movements of the gear to the strip feeding device.

BRUCE THOMAS BICKEL.